United States Patent
Inomata

(10) Patent No.: US 9,855,948 B2
(45) Date of Patent: Jan. 2, 2018

(54) VEHICLE CONTROL DEVICE

(71) Applicant: TOYOTA JIDOSHA KABUSHIKI KAISHA, Toyota-shi, Aichi (JP)

(72) Inventor: Ryo Inomata, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/033,683

(22) PCT Filed: Nov. 5, 2014

(86) PCT No.: PCT/JP2014/079898
§ 371 (c)(1),
(2) Date: May 2, 2016

(87) PCT Pub. No.: WO2015/079909
PCT Pub. Date: Jun. 4, 2015

(65) Prior Publication Data
US 2016/0272202 A1    Sep. 22, 2016

(30) Foreign Application Priority Data

Nov. 26, 2013 (JP) .................. 2013-244033

(51) Int. Cl.
*B60W 50/10* (2012.01)
*B60W 30/12* (2006.01)
(Continued)

(52) U.S. Cl.
CPC .............. *B60W 30/12* (2013.01); *B62D 1/04* (2013.01); *B62D 5/0481* (2013.01); *B60W 30/095* (2013.01)

(58) Field of Classification Search
CPC ...... B62D 5/0481; B62D 15/00; B62D 6/003; B60W 50/10; B60W 50/14; B60T 8/1708; B60T 8/17557; G05D 1/0214
See application file for complete search history.

(56) References Cited

U.S. PATENT DOCUMENTS

| 8,090,537 B2 * | 1/2012 | Nishira ................ G05D 1/0214 340/436 |
| 9,327,765 B2 * | 5/2016 | Takeda ................... B62D 6/003 |

(Continued)

FOREIGN PATENT DOCUMENTS

| JP | 2006-199134 A | 8/2006 |
| JP | 2009-248599 A | 10/2009 |

OTHER PUBLICATIONS

Japanese Decision of a Patent Grant for JP 2013-244033 dated Aug. 4, 2015.

*Primary Examiner* — Yuri Kan
(74) *Attorney, Agent, or Firm* — Sughrue Mion, PLLC

(57) ABSTRACT

A vehicle control device includes: a lane departure prevention unit configured to control an execution of a traveling control of preventing a vehicle from departing from a lane; a gripping detection unit configured to detect a state where a steering wheel is gripped; and a collision detection unit configured to detect a state where the vehicle collides an object. In a case where the collision detection unit does not detect a collision during the traveling control, the lane departure prevention unit does not interrupt the traveling control at a time the steering wheel is gripped, and interrupts the traveling control at a time the steering wheel is not gripped. In a case where the collision detection unit detects the collision, the lane departure prevention unit does not interrupt the traveling control at the time the steering wheel is gripped or at the time the steering wheel is not gripped.

3 Claims, 6 Drawing Sheets

(51) Int. Cl.
*B62D 1/04* (2006.01)
*B62D 5/04* (2006.01)
*B60W 30/095* (2012.01)

(56) References Cited

U.S. PATENT DOCUMENTS

| | | | |
|---|---|---|---|
| 2005/0096828 A1* | 5/2005 | Uemura | B60T 8/17557 |
| | | | 701/70 |
| 2008/0091318 A1* | 4/2008 | Deng | B62D 6/003 |
| | | | 701/41 |
| 2012/0109465 A1* | 5/2012 | Svensson | B60T 8/1708 |
| | | | 701/42 |
| 2013/0317699 A1* | 11/2013 | Urhahne | B62D 15/025 |
| | | | 701/41 |
| 2014/0148988 A1* | 5/2014 | Lathrop | B60W 50/10 |
| | | | 701/23 |
| 2015/0291216 A1* | 10/2015 | Sato | B60W 50/14 |
| | | | 701/23 |

* cited by examiner

FIG.2

| LKA SWITCH | ACC | LDW (ALARM FUNCTION) | LKA (LANE KEEPING ASSIST FUNCTION) |
|---|---|---|---|
| | | CASE OF VEHICLE SPEED EQUAL TO OR FASTER THAN 50 km/h | CASE OF VEHICLE SPEED IN RANGE OF 65 TO 100 km/h |
| ON | OFF | O | × |
| | CASE OF SET VEHICLE SPEED EQUAL TO OR SLOWER THAN 64 km/h | O | × |
| | CASE OF SET VEHICLE SPEED EQUAL TO OR FASTER THAN 65 km/h | O | O |

FIG.3

[ACTIVATION CONDITION FOR LKA (LANE KEEPING ASSIST FUNCTION)]
AND
- CASE OF ON STATE OF LKA SWITCH
- CASE OF TRAVELING VEHICLE SPEED WITHIN PREDETERMINED RANGE
- CASE OF RECOGNITION OF WHITE LINE
- CASE OF NON-DETECTION OF SYSTEM ERROR
- CASE OF NON-ACTIVATION OF TURN SIGNAL

[INTERRUPTION CONDITION FOR LKA (LANE KEEPING ASSIST FUNCTION)]
OR
- CASE OF TRAVELING VEHICLE SPEED OUT OF PREDETERMINED RANGE
- CASE OF NON-RECOGNITION OF WHITE LINE
- CASE OF HANDS FREE STATE DETECTION
- CASE OF ACTIVATION OF TURN SIGNAL

[RETURN CONDITION FOR LKA (LANE KEEPING ASSIST FUNCTION)]
AND
- CASE OF ON STATE OF LKA SWITCH
- CASE OF TRAVELING VEHICLE SPEED WITHIN PREDETERMINED RANGE
- CASE OF RECOGNITION OF WHITE LINE
- CASE OF NON-DETECTION OF HANDS FREE STATE
- CASE OF NON-ACTIVATION OF TURN SIGNAL

[END CONDITION FOR LKA (LANE KEEPING ASSIST FUNCTION)]
OR
- CASE OF OFF STATE OF LKA SWITCH
- CASE OF DETECTION OF BRAKE OPERATION
- CASE OF DETECTION OF SYSTEM ERROR
- CASE OF OFF STATE OF ENGINE

VEHICLE CONTROL DEVICE

CROSS REFERENCE TO RELATED APPLICATIONS

This application is a National Stage of International Application No. PCT/JP2014/079898 filed Nov. 5, 2014, claiming priority based on Japanese Patent Application No. 2013-244033 filed Nov. 26, 2013, the contents of all of which are incorporated herein by reference in their entirety.

TECHNICAL FIELD

The present invention relates to a vehicle control device.

BACKGROUND ART

Hitherto, a lane departure prevention control technique has been developed which executes a traveling control, that is, a lane keeping assist (LKA) control which is executed as a lane keeping assist function for preventing an own vehicle from departing from a lane.

For example, Patent Literature 1 discloses a technique of controlling an electric power steering wheel so that a steering angle of the steering wheel becomes substantially equal to a lane direction when there is a large possibility that a collision may occur. Accordingly, since the technique disclosed in Patent Literature 1 moves an own vehicle so that the own vehicle follows a lane even when the own vehicle advances due to a rear collision, it is possible to prevent a secondary collision caused when the own vehicle travels over the opposing lane.

Further, Patent Literature 2 discloses a technique of selecting a lane keeping assist mode in which an LKA control is executed so that an own vehicle follows a lane when a driver operates a steering wheel, interrupting the lane keeping assist mode when the driver drives the vehicle in a hands free state, and selecting a lane departure alarm mode in which a control, that is, a lane departure warning (LDW) is executed to generate a lane departure alarm by an alarm buzzer or the like.

CITATION LIST

Patent Literature

Patent Literature 1: Japanese Laid-open Patent Publication No. 2006-199134
Patent Literature 2: Japanese Laid-open Patent Publication No. 2009-248599

DISCLOSURE OF INVENTION

Problems to be Solved by the Invention

Incidentally, in the lane departure prevention control technique based on the control condition in which the LKA control is not interrupted when the driver grips the steering wheel and the LKA control is interrupted when the driver releases a hand from the steering wheel during the LKA control, the following problems arise.

For example, a situation may be considered in which the driver cannot grip the steering wheel due to the deployment of the airbag or the impact caused by a primary collision after the primary collision occurs. In such a situation, when the control condition for Patent Literature 1 is set so that the LKA control is interrupted when the driver releases a hand from the steering wheel as in Patent Literature 2, the LKA control is not executed when the driver releases a hand from the steering wheel, and then the own vehicle cannot automatically travel so that the own vehicle follows the lane. As a result, there is a concern that the own vehicle may travel over the opposing lane.

The invention is made in view of the above-described circumstances, and an object of the invention is to provide a vehicle control device capable of suppressing a secondary collision by preventing a departure from a lane even when a driver cannot grip a steering wheel due to an impact caused by a collision, in a lane departure prevention control technique based on a control condition in which an LKA control is not interrupted when the driver grips the steering wheel and the LKA control is interrupted when the driver releases a hand from the steering wheel during the LKA control.

Solution to the Problems

A vehicle control device of the invention includes a lane departure prevention means configured to control an execution of a traveling control of preventing a vehicle from departing from a lane; a gripping detection means configured to detect a state where a steering wheel is gripped by a driver; and a collision detection means configured to detect a state where the vehicle collides an object outside the vehicle. Wherein, in a case where the collision detection means does not detect a collision during the traveling control, the lane departure prevention means does not interrupt the traveling control at a time the steering wheel is gripped, and interrupts the traveling control at a time the steering wheel is not gripped. In a case where the collision detection means detects the collision, the lane departure prevention means does not interrupt the traveling control at the time the steering wheel is gripped or at the time the steering wheel is not gripped.

A vehicle control device of the invention includes a lane departure prevention means configured to control an execution of a traveling control of preventing a vehicle from departing from a lane; a gripping detection means configured to detect a state where a steering wheel is gripped by a driver; and a collision detection means configured to detect a state where the vehicle collides an object outside the vehicle. Wherein, the lane departure prevention means activates the traveling control, in a case where an activation condition for the traveling control, including at least a state where the lane along which the vehicle travels is recognized, is satisfied. The lane departure prevention means interrupts the traveling control at a time the traveling control is activated, in a case where an interruption condition for the traveling control including a state where the steering wheel is not gripped, is satisfied. Wherein, in a case where the collision detection means does not detect a collision, the state where the steering wheel is not gripped is included in the interruption condition. In a case where the collision detection means detects the collision, the state where the steering wheel is not gripped is not included in the interruption condition.

In the vehicle control device, wherein, in a case where all the activation conditions for the traveling control are satisfied, in which a plurality of conditions including at least a state where the lane is recognized is set, the lane departure prevention means activates the traveling control. In the case where the collision detection means detects the collision, the lane departure prevention means activates the traveling control, even at the time a condition, in which the condition indicating the state where the lane is recognized is excluded from the plurality of conditions set in the activation condition, is not satisfied.

Effects of the Invention

The vehicle control device according to the invention has an advantage that a secondary collision can be suppressed by preventing a departure from a lane, even when a driver cannot grip a steering wheel due to an impact caused by a collision, in a lane departure prevention control technique based on a control condition in which an LKA control is not interrupted when the driver grips the steering wheel and the LKA control is interrupted when the driver releases a hand from the steering wheel during the LKA control.

BRIEF DESCRIPTION OF DRAWINGS

FIG. 2 is a diagram illustrating an example of an activation determining condition for a lane departure prevention control.

FIG. 3 is a diagram illustrating an example of a control condition for an LKA (a lane keeping assist function).

DESCRIPTION OF EMBODIMENTS

Hereinafter, an embodiment of a vehicle control device according to the invention will be described in detail with reference to the drawings. Furthermore, the invention is not limited to the embodiment. Further, components of the embodiment below include a component which can be easily supposed by a person skilled in the art or a component which has substantially the same configuration.

Embodiment

Figure 1:
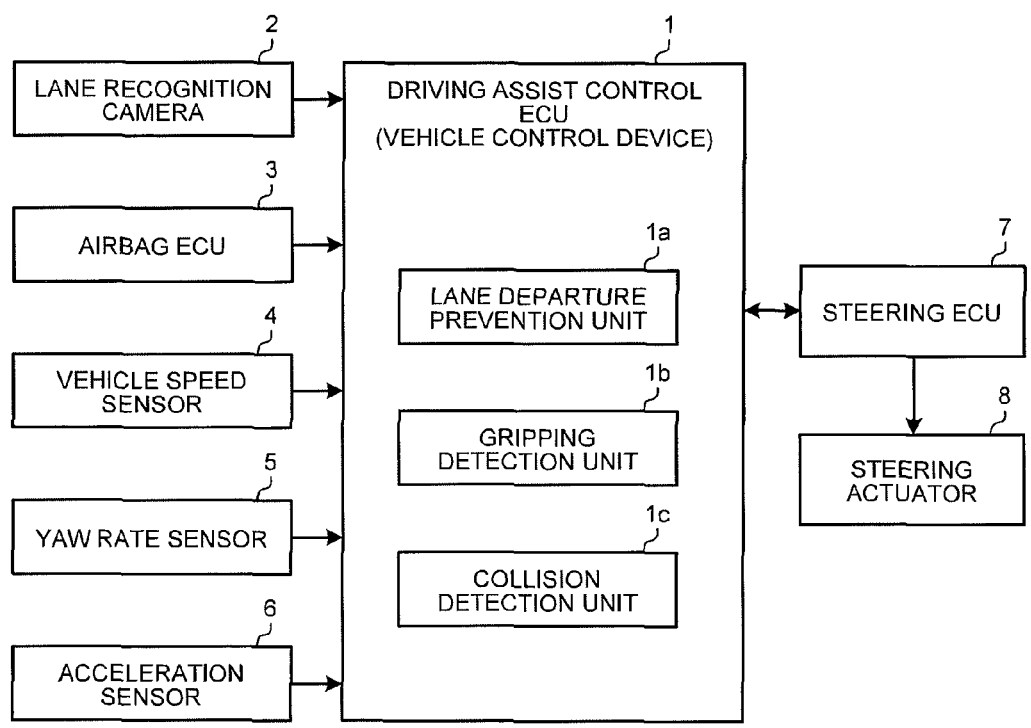
FIG. 1 is a diagram illustrating the configuration of a vehicle control device.
Figure 4:
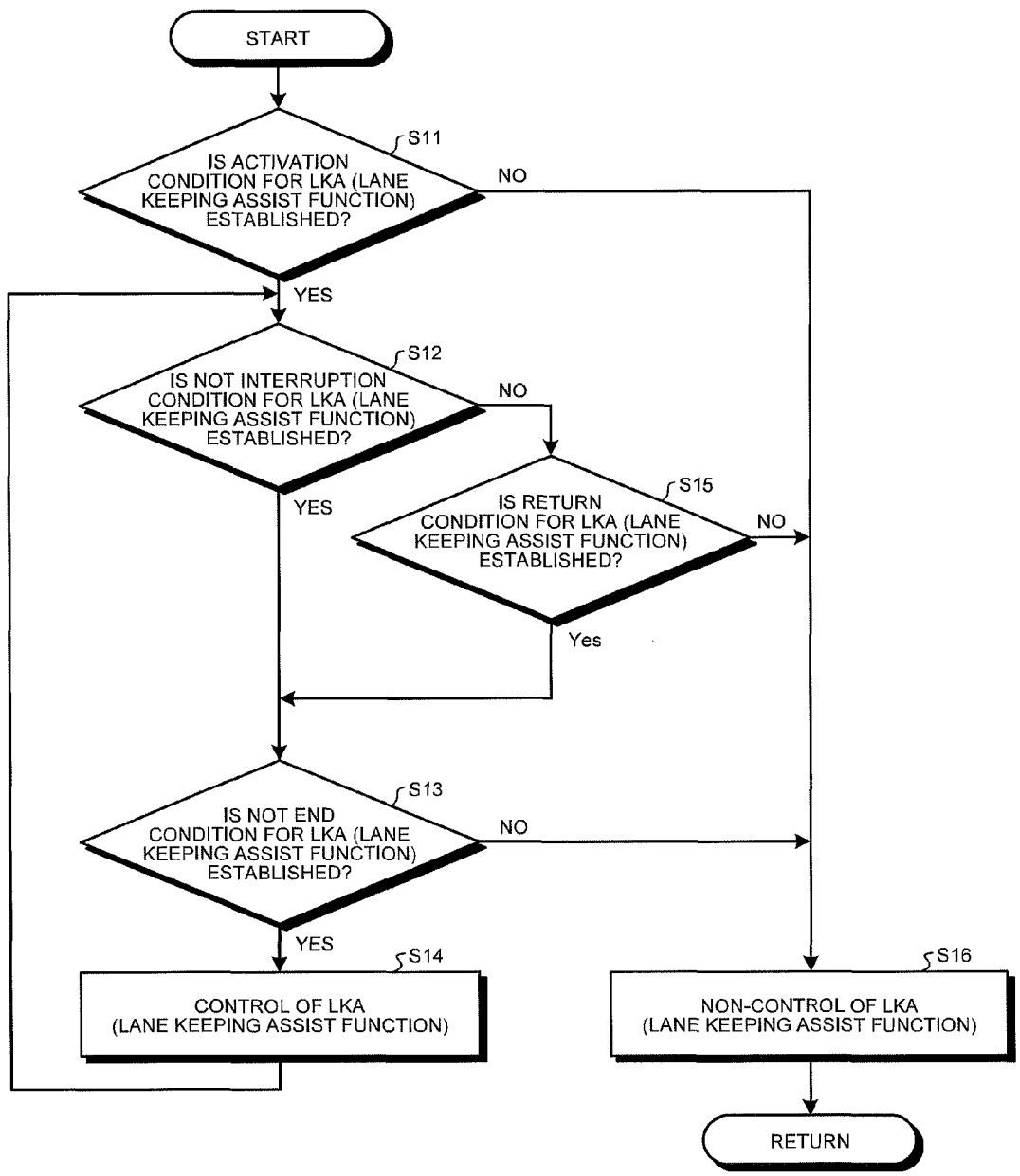
FIG. 4 is a flowchart illustrating an example of a lane keeping assist control process.
Figure 5:
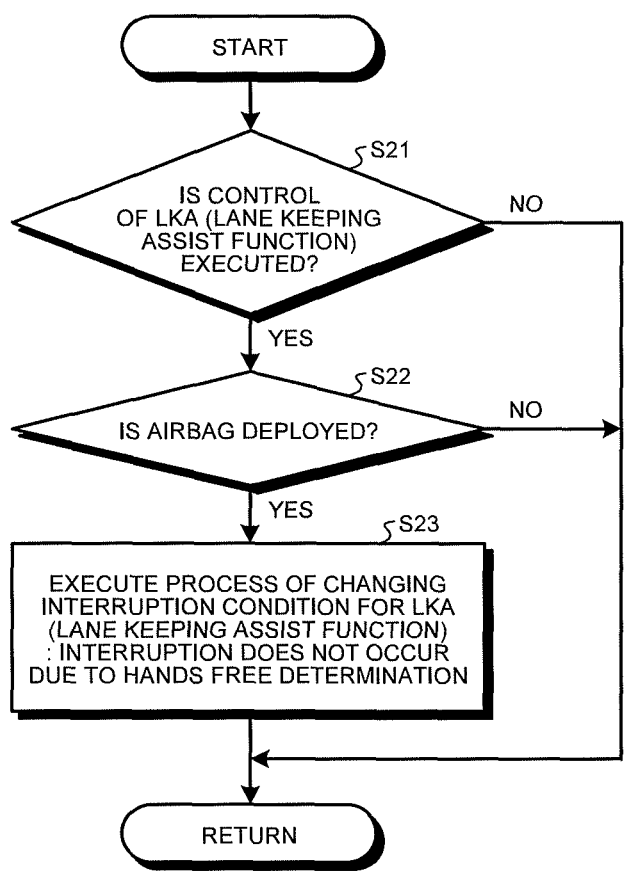
FIG. 5 is a flowchart illustrating an example of an interruption condition change process.

Referring to FIGS. 1 to 5, the embodiment of the vehicle control device will be described. FIG. 1 is a diagram illustrating the configuration of the vehicle control device. FIG. 2 is a diagram illustrating an example of an activation determining condition for a lane departure prevention control. FIG. 3 is a diagram illustrating an example of an LKA control condition. FIG. 4 is a flowchart illustrating an example of a lane keeping assist control process. FIG. 5 is a flowchart illustrating an example of an interruption condition change process.

Referring to FIG. 1, the configuration of the vehicle control device will be described. A driving assist control ECU 1 is a vehicle control device which performs a driving assist control of controlling the behavior of the vehicle. The driving assist control ECU 1 is electrically connected to a lane recognition camera 2, an airbag ECU 3, a vehicle speed sensor 4, a yaw rate sensor 5, an acceleration sensor 6, a steering ECU 7, and a steering actuator 8. The driving assist control ECU 1 performs a calculation process based on various signals input from the lane recognition camera 2, the airbag ECU 3, the vehicle speed sensor 4, the yaw rate sensor 5, and the acceleration sensor 6. The driving assist control ECU 1 performs a driving assist control of controlling the behavior of the vehicle by outputting a steering control signal obtained based on the calculation process result to the steering actuator 8 via the steering ECU 7 and operating the steering actuator 8.

The lane recognition camera 2 is a lane recognition device which recognizes a lane such as a white line on a road. For example, the lane recognition camera 2 is attached to each of front, right, left, and rear surfaces of the vehicle, or the like. When the lane recognition camera 2 recognizes the lane on the road based on an image captured around the vehicle, the lane recognition camera outputs the lane recognition result to the driving assist control ECU 1. The lane recognition camera 2 recognizes the lane by performing, for example, a well-known edge process or pattern matching process on image data. The lane recognition result includes, for example, information on a vehicle-to-lane position, a vehicle-to-lane distance, a lane shape, and a lane type, or the like.

The airbag ECU 3 is an airbag control device which controls an airbag mechanism (not illustrated) mounted on the vehicle. The airbag mechanism is a mechanism which protects a passenger by deploying an airbag in the event of a collision accident. The airbag mechanism includes such as a front airbag mechanism which is installed in the vicinity of a steering wheel of the vehicle so as to protect the front surface of the passenger and a side airbag mechanism which is installed in the vicinity of a door of the vehicle so as to protect the side surface of the passenger. The airbag ECU 3 is electrically connected to at least a collision detection sensor (not illustrated), the airbag mechanism, and the driving assist control ECU 1. The collision detection sensor is attached to each of the front, right, left, and rear surfaces of the vehicle, or the like. When the collision detection sensor detects the collision of the vehicle, the collision detection sensor outputs a collision generation signal to the airbag ECU 3. The airbag ECU 3 controls the airbag mechanism by outputting an airbag control signal to the airbag mechanism when the collision generation signal is input from the collision detection sensor. The airbag ECU 3 controls the airbag mechanism and outputs the collision generation signal input from the collision detection sensor to the driving assist control ECU 1.

The vehicle speed sensor 4 is a vehicle wheel speed detection device which is installed in each vehicle wheel and detects each vehicle wheel speed. Each vehicle speed sensor 4 detects the vehicle wheel speed as the rotation speed of each vehicle wheel. Each vehicle speed sensor 4 outputs a vehicle wheel speed signal indicating the detected vehicle wheel speed of each vehicle wheel to the driving assist control ECU 1. The driving assist control ECU 1 calculates the vehicle speed as the vehicle traveling speed based on the vehicle wheel speed of each vehicle wheel input from each vehicle speed sensor 4. The driving assist control ECU 1 may calculate the vehicle speed based on the vehicle wheel speed input from at least one of the vehicle speed sensors 4.

The yaw rate sensor 5 is a yaw rate detection device which detects the yaw rate of the vehicle. The yaw rate sensor 5 outputs a yaw rate signal indicating the detected yaw rate of the vehicle to the driving assist control ECU 1.

The acceleration sensor 6 is an acceleration detection device which detects an acceleration applied to a vehicle body. For example, the acceleration sensor 6 detects the acceleration applied to the vehicle body when the vehicle is accelerated or decelerated. The acceleration sensor 6 outputs an acceleration signal indicating the detected acceleration applied to the vehicle body to the driving assist control ECU 1.

The steering ECU 7 is a steering control device which controls the operation of the steering actuator 8 based on the steering control signal input from the driving assist control ECU 1. The steering ECU 7 is electrically connected to the driving assist control ECU 1 and the steering actuator 8. The steering ECU 7 performs a steering control of operating the steering actuator 8 based on the steering control signal input from the driving assist control ECU 1. The steering actuator 8 is a steering device which can steer the vehicle by controlling the steering angle of the steering wheel of the vehicle based on the input steering control signal.

In the embodiment, the driving assist control ECU 1 executes a lane departure prevention control for preventing the departure of the own vehicle from the lane. The lane departure prevention control includes a lane departure warning (LDW) as an alarm function and a lane keeping assist (LKA) as a lane keeping assist function. In the lane departure prevention control, the LDW (the alarm function) is a control of warning a driver by an alarm buzzer or the like when the own vehicle is about to depart from the lane while the vehicle is traveling, in order to prevent an accident caused by the departure from the lane in advance. The LKA (the lane keeping assist function) is a traveling control of assisting the traveling operation along the lane. That is, the lane departure prevention control which is executed by the driving assist control ECU 1 of the embodiment includes two functions of the alarm function and the lane keeping assist function. When it is determined that the own vehicle may depart from the lane, the alarm function refreshes the driver's attention to prevent the departure from the lane in a manner such that an alarm buzzer generates a sound, a display displays an alarm, or a small steering force is applied to the steering wheel for a short time. When it is determined that the own vehicle may depart from the lane in an ACC operation state, the lane keeping assist function assists a steering operation so that the own vehicle easily travels along the vicinity of the center of the lane by continuously applying a small steering force to the steering wheel.

For example, an example of an activation determining condition for the lane departure prevention control will be described with reference to FIG. 2. As illustrated in FIG. 2, the driving assist control ECU 1 executes the LDW (the alarm function) in the lane departure prevention control, when the vehicle speed is equal to or faster than 50 km/h, in the case where an LKA switch is turned on and an ACC is turned off. Further, the driving assist control ECU 1 executes the LDW (the alarm function) in the lane departure prevention control, when the vehicle speed is equal to or faster than 50 km/h, in the case where the LKA switch is turned on, the ACC is turned on, and the ACC setting vehicle speed is equal to or slower than 64 km/h. Further, the driving assist control ECU 1 executes the LDW (the alarm function) in the lane departure prevention control, when the vehicle speed is equal to or faster than 50 km/h, in the case where the LKA switch is turned on, the ACC is turned on, and the ACC setting vehicle speed is equal to or faster than 65 km/h. In addition, the driving assist control ECU 1 also executes the LKA (the lane keeping assist function), when the vehicle speed is in the range of 65 km to 100 km/h in this state. Furthermore, the vehicle speed value of the activation determining condition for the lane departure prevention control illustrated in FIG. 2 is an example, and is not limited thereto.

An example of a control condition for the LKA (the lane keeping assist function) in the lane departure prevention control will be described further with reference to FIG. 3. FIG. 3 illustrates an example of an activation condition, an interruption condition, a return condition, and an end condition for the LKA (the lane keeping assist function). As illustrated in FIG. 3, for example, as the activation condition for the LKA (the lane keeping assist function), a condition for activating the lane keeping assist function is set, when the LKA switch is turned on, the traveling vehicle speed is within a predetermined range, the white line is recognized, the system error is not detected, and the turn signal is not activated. Furthermore, since the LKA cannot be activated in the state where at least the white line is not recognized, the activation condition includes a state where at least the white line is recognized. Further, as the interruption condition for the LKA (the lane keeping assist function), a condition for interrupting the lane keeping assist function is set, when the traveling vehicle speed is out of a predetermined range, the white line is not recognized, the hands free state is detected in which the driver does not grip the steering wheel (the hands free detection state), or the turn signal is activated. Further, as the return condition for the LKA (the lane keeping assist function), a condition for returning the lane keeping assist function is set, when the LKA switch is turned on, the traveling vehicle speed is within a predetermined range, the white line is recognized, the hands free state is not detected in which the driver does not grip the steering wheel (the hands free non-detection state), and the turn signal is not activated. Further, as the end condition for the LKA (the lane keeping assist function), a condition for ending the lane keeping assist function is set, when the LKA switch is turned off, the brake operation is detected, the system error is detected, or the engine is turned off.

In the embodiment, for example, the hands free determination on whether the steering wheel is gripped by the driver is established, when a steering torque as an input torque input from the steering wheel is smaller than a predetermined value for a predetermined time.

Here, when the vehicle collides with an object outside the vehicle while the lane keeping assist function is executed under the above-described LKA control condition, a case may be supposed in which the driver cannot grip the steering wheel due to the impact generated by the collision or the deployment of the airbag (for example, the front airbag installed in the vicinity of the steering wheel). Here, it is assumed that the lane keeping assist is not executed when the driver releases the hand from the steering wheel. In such a state, since the driver releases the hand from the steering wheel, the lane keeping assist is not executed, and the own vehicle cannot automatically travel along the lane. As a result, there is a concern that the own vehicle may travel over the opposing lane. For that reason, it is desirable to reliably execute the LKA after the collision, in the vehicle in which the LKA is not executed when the vehicle travels in the hands free state.

Therefore, in the driving assist control ECU 1 according to the embodiment, various process units below perform various calculation processes for continuously performing the lane keeping assist function even when the hands free determination is established, when the airbag is deployed during the execution of the lane keeping assist function. As illustrated in FIG. 1, the driving assist control ECU 1 includes at least a lane departure prevention unit 1a, a gripping detection unit 1b, and a collision detection unit 1c.

The lane departure prevention unit 1a is a lane departure prevention means which controls the execution of the traveling control (that is, the LKA control as the lane keeping assist function) of preventing the vehicle from departing from the lane. In the case where the collision detection unit 1c does not detect the collision during the activation of the traveling control (that is, the LKA control), the lane departure prevention unit 1a does not interrupt the traveling control when the steering wheel is gripped and interrupts the traveling control when the steering wheel is not gripped. Here, the lane departure prevention unit 1a may interrupt the LKA control after performing the LKA for a predetermined time when the steering wheel is not gripped. Meanwhile, the lane departure prevention unit 1a does not interrupt the traveling control in any of the case where the steering wheel is gripped and the case where the steering wheel is not gripped, when the collision detection unit 1c detects the collision.

The gripping detection unit 1b is a gripping detection means which detects a state where the steering wheel is gripped by the driver. For example, when a time in which an actual steering torque continuously becomes smaller than the torque determination threshold value exceeds a predetermined hands free determination time, the gripping detection unit 1b determines that the driver drives the vehicle in the hands free state on the assumption that the steering wheel is not operated for a predetermined time or more. Meanwhile, when a time in which the actual steering torque continuously becomes smaller than the torque determination threshold value does not exceed the predetermined hands free determination time, the gripping detection unit 1b determines that the driver does not drive the vehicle in the hands free state.

The collision detection unit 1c is a collision detection means which detects the collision of the vehicle. The collision detection unit 1c detects the collision of the vehicle based on the collision generation signal input from the airbag ECU 3 to the driving assist control ECU 1.

Hereinafter, the lane keeping assist control process and the interruption condition change process executed by the vehicle control device of the embodiment will be described in detail.

Referring to FIG. 4, the lane keeping assist control process will be described. Furthermore, the processes in step S11 to step S16 of FIG. 4 are repeated every predetermined calculation period.

As illustrated in FIG. 4, the lane departure prevention unit 1a of the driving assist control ECU 1 determines whether the activation condition in the control condition for the LKA (the lane keeping assist function) illustrated in FIG. 3 is established (step S11). Specifically, the lane departure prevention unit 1a determines that the activation condition for the LKA is established, when all activation conditions for the LKA are satisfied in which a plurality of predetermined conditions including a state where a lane such as a white line is recognized is set (for example, as illustrated in FIG. 3, the LKA switch is turned on, the traveling vehicle speed is within a predetermined range, the white line is recognized, the system error is not detected, and the turn signal is not activated). Meanwhile, the lane departure prevention unit 1a determines that the activation condition for the LKA is not established, when any one of the plurality of conditions set in the activation condition for the LKA is not satisfied.

In step S11, when the lane departure prevention unit 1a of the driving assist control ECU 1 determines that the activation condition for the LKA (the lane keeping assist function) is established (step S11: Yes), the lane departure prevention unit 1a activates the lane keeping assist function and then determines whether the interruption condition in the control condition for the LKA (the lane keeping assist function) is established (step S12). Specifically, the lane departure prevention unit 1a determines that the interruption condition for the LKA is established, when any one of the interruption conditions for the LKA is satisfied in which a plurality of predetermined conditions indicating a state where the steering wheel is not gripped is set (for example, as illustrated in FIG. 3, the traveling vehicle speed is out of a predetermined range, the white line is not recognized, the hands free state is detected in which the driver does not grip the steering wheel (the hands free detection state), or the turn signal is activated). Meanwhile, the lane departure prevention unit 1a determines that the interruption condition for the LKA is not established, when any one of the plurality of conditions set in the interruption condition for the LKA is not established. Here, as illustrated in FIG. 3, the hands free detection state is included in the interruption condition. For that reason, in step S12, the gripping detection unit 1b of the driving assist control ECU 1 detects a state where the steering wheel is not gripped by the driver. For example, when a time in which an actual steering torque continuously becomes smaller than a torque determination threshold value exceeds a predetermined hands free determination time, the gripping detection unit 1b of the driving assist control ECU 1 determines that the driver drives the vehicle in the hands free state (that is, the steering wheel is not gripped) on the assumption that the steering wheel is not operated for a predetermined time or more.

In step S12, the lane departure prevention unit 1a of the driving assist control ECU 1 determines that the interruption condition for the LKA (the lane keeping assist function) is not established (step S12: Yes), the lane departure prevention unit 1a does not interrupt the lane keeping assist function and determines whether the end condition in the control condition for the LKA (the lane keeping assist function) is established (step S13). Specifically, the lane departure prevention unit 1a determines that the end condition for the LKA is established, when any one of the end conditions for the LKA is satisfied in which a plurality of predetermined conditions is set (for example, as illustrated in FIG. 3, the LKA switch is turned off, the brake operation is detected, the system error is detected, or the engine is turned off). Meanwhile, the lane departure prevention unit 1a determines that the end condition for the LKA is not established, when any one of the plurality of conditions set in the end condition for the LKA is not satisfied.

In step S13, when the lane departure prevention unit 1a of the driving assist control ECU 1 determines that the end condition for the LKA (the lane keeping assist function) is not established (step S13: Yes), the lane departure prevention unit 1a does not end the lane keeping assist function and erects a flag indicating a state where the control of the LKA (the lane keeping assist function) is executed (step S14). Subsequently, this process is repeated from step S12.

Returning to step S12, the lane departure prevention unit 1a of the driving assist control ECU 1 determines whether the interruption condition for the LKA (the lane keeping assist function) is established. Then, in step S12, when the lane departure prevention unit 1a of the driving assist control ECU 1 determines the interruption condition for the LKA (the lane keeping assist function) is established (step S12: No), the lane departure prevention unit 1a interrupts the lane keeping assist function and determines whether the return condition in the control condition for the LKA (the lane keeping assist function) is established (step S15). Specifically, the lane departure prevention unit 1a determines that the return condition for the LKA is established when all return conditions for the LKA are satisfied in which a plurality of predetermined conditions including at least a state where a lane such as a white line is recognized are set (for example, as illustrated in FIG. 3, the LKA switch is turned on, the traveling vehicle speed is within a predetermined range, the white line is recognized, the hands free state is not determined in which the driver does not grip the steering wheel (the hands free non-detection state), and the turn signal is not activated). Meanwhile, the lane departure prevention unit 1a determines that the return condition for the LKA is not established when any one of the plurality of conditions set in the return condition for the LKA is not satisfied. Here, as illustrated in FIG. 3, the return condition includes the hands free non-detection state. For that reason, in step S15, when a time in which an actual steering torque continuously becomes smaller than a torque determination threshold value does not exceed a hands free determination time, the gripping detection unit 1b of the driving assist control ECU 1 determines that the driver does not drive the vehicle in the hands free state (that is, the steering wheel is gripped).

In step S15, when the lane departure prevention unit 1a of the driving assist control ECU 1 determines that the return condition for the LKA (the lane keeping assist function) is established (step S15: Yes), the lane departure prevention unit 1a resumes the lane keeping assist function and determines whether the end condition in the control condition for the LKA (the lane keeping assist function) is established (step S13). Then, in step S13, when the lane departure prevention unit 1a of the driving assist control ECU 1 determines the end condition for the LKA (the lane keeping assist function) is not established (step S13: Yes), the lane departure prevention unit 1a does not end the lane keeping assist function and erects a flag indicating a state where the control of the LKA (the lane keeping assist function) is executed. Subsequently, this process is repeated from step S12.

Here, in step S15, when the lane departure prevention unit 1a of the driving assist control ECU 1 determines that the return condition for the LKA (the lane keeping assist function) is not established (step S15: No), the lane departure prevention unit 1a does not resume the lane keeping assist function and erects a flag indicating a state where the control of the LKA (the lane keeping assist function) is not executed. Similarly, in step S13, even when the lane departure prevention unit 1a of the driving assist control ECU 1 determines that the end condition for the LKA (the lane keeping assist function) is established (step S13: No), the lane departure prevention unit 1a ends the lane keeping assist function and erects a flag indicating a state where the control of the LKA (the lane keeping assist function) is not executed. Subsequently, this process is repeated from step S11.

Furthermore, in step S11, even when the lane departure prevention unit 1a of the driving assist control ECU 1 determines that the activation condition for the LKA (the lane keeping assist function) is not established (step S11: No), the lane departure prevention unit 1a erects a flag indicating a state where the control of the LKA (the lane keeping assist function) is not executed. Subsequently, this process is repeated from step S11.

In this way, the lane departure prevention unit 1a of the driving assist control ECU 1 determines whether to activate, interrupt, return, or end the LKA (the lane keeping assist function) in accordance with the control condition including the activation condition, the interruption condition, the return condition, and the end condition for the LKA (the lane keeping assist function) illustrated in FIG. 3, and then controls the execution of the lane keeping assist function. Then, the lane departure prevention unit 1a of the driving assist control ECU 1 erects a flag indicating a state where the control of the LKA (the lane keeping assist function) is executed, when the lane keeping assist function is executed, and erects a flag indicating a state where the control of the LKA (the lane keeping assist function) is not executed, when the lane keeping assist function is not executed.

Subsequently, the interruption condition change process of the lane keeping assist function will be described with reference to FIG. 5. Furthermore, the processes of step S21 to step S23 of FIG. 5 are repeated every predetermined calculation period. The interruption condition change process illustrated in FIG. 5 is executed in parallel with the lane keeping assist control process illustrated in FIG. 4.

As illustrated in FIG. 5, the lane departure prevention unit 1a of the driving assist control ECU 1 determines whether the control of the LKA (the lane keeping assist function) is executed by checking the type of flag erected in step S14 or step S16 of FIG. 4 (step S21).

Here, in step S21, when the lane departure prevention unit 1a of the driving assist control ECU 1 checks a flag indicating a state where the control of the LKA (the lane keeping assist function) is executed (step S21: Yes), the lane departure prevention unit 1a executes the process in step S22. Furthermore, in step S21, when the lane departure prevention unit 1a of the driving assist control ECU 1 checks a flag indicating a state where the control of the LKA (the lane keeping assist function) is not executed (step S21: No), the lane departure prevention unit 1a terminates this process and returns to step S21.

The collision detection unit 1c of the driving assist control ECU 1 determines whether the airbag is deployed by detecting the collision of the vehicle based on the collision generation signal input from the airbag ECU 3 to the driving assist control ECU 1 (step S22). Furthermore, in step S22, when the collision detection unit 1c of the driving assist control ECU 1 determines that the airbag is not deployed (step S22: No), the collision detection unit 1c terminates this process and returns to step S21.

In step S22, when the lane departure prevention unit 1a of the driving assist control ECU 1 determines the airbag is deployed by the collision detection unit 1c of the driving assist control ECU 1 (step S22: Yes), the lane departure prevention unit 1a changes the interruption condition so that the interruption does not occur due to the hands free determination in the interruption condition for the LKA (the lane keeping assist function) (step S23). Specifically, the condition for the hands free state in which the driver does not grip the steering wheel (the hands free detection state) in the interruption condition for the lane keeping assist function illustrated in FIG. 3 is excluded from the interruption condition for the lane keeping assist function. That is, the lane departure prevention unit 1a of the driving assist control ECU 1 changes the control condition in which the traveling control of preventing the departure from the lane is not performed (that is, the LKA control is interrupted) when the steering wheel is not gripped in the case where the collision detection unit 1c detects the collision, to the control condition in which the traveling control of preventing the departure from the lane is performed (that is, the LKA control is not interrupted) even when the steering wheel is not gripped in the case where the collision detection unit 1c detects the collision. In other words, the state where the steering wheel is gripped is included in the interruption condition when the collision detection unit 1c does not detect the collision, and the state where the steering wheel is gripped is not included in the interruption condition when the collision detection unit 1c detects the collision. Subsequently, this process terminates, and returns to step S21.

Accordingly, the determination on whether the interruption condition for the LKA (the lane keeping assist function) is established in step S12 of the lane keeping assist control process illustrated in FIG. 4 is executed based on the state where the interruption condition for the lane keeping assist function (that is, the traveling vehicle speed is out of a predetermined range, the white line is not recognized, or the turn signal is activated) other than the hands free detection state illustrated in FIG. 3, instead of the hands free state in which the driver does not grip the steering wheel. As a result, the driving assist control ECU 1 according to the embodiment can continuously execute the lane keeping assist function even when the hands free determination is established in the case where the airbag is deployed during the execution of the lane keeping assist function.

For example, in the conventional lane departure prevention control technique (Patent Literatures 1 and 2), a situation is not considered in which the driver feels difficulty in the steering operation due to the deployment of the airbag or the impact caused by the primary collision. However, in the vehicle control device (the driving assist control ECU 1) according to the invention, a situation is considered in which the driver feels difficulty due to the deployment of the airbag or the impact caused by the primary collision. For this reason, when the collision is detected, the steering operation can be assisted even when the driver releases the steering wheel. Thus, according to the vehicle control device of the invention, in the lane departure prevention control technique based on the control condition in which the LKA control is not interrupted when the driver grips the steering wheel during the LKA control and the LKA control is interrupted when the driver does not grip the steering wheel, it is possible to prevent the departure from the lane even when the driver cannot grip the steering wheel due to the impact caused by the collision, and hence to suppress a secondary collision.

Figure 6:
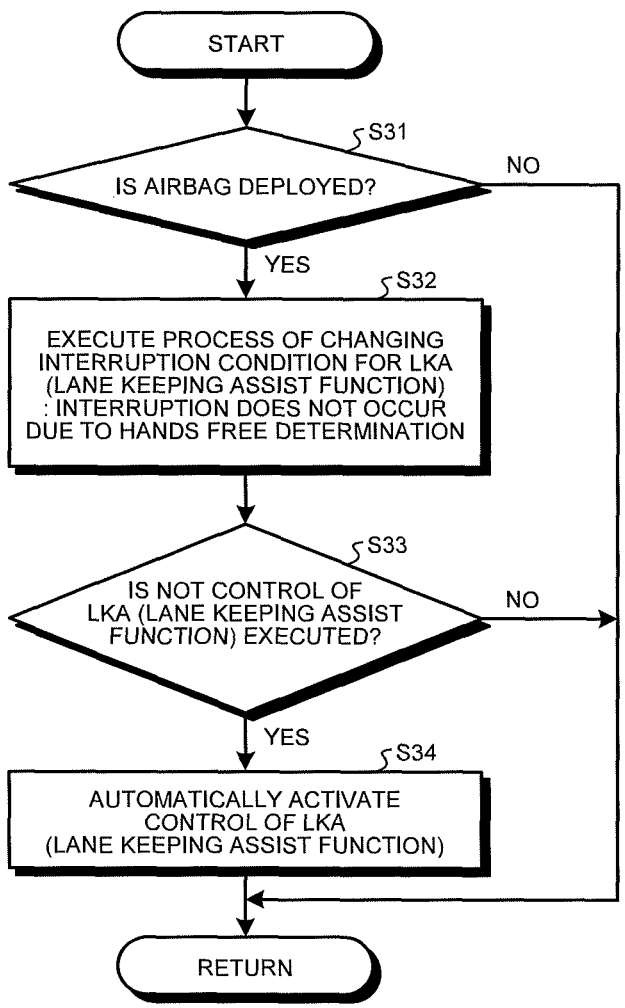
FIG. 6 is a flowchart illustrating another example of the interruption condition change process.

In the embodiment, the interruption condition change process of the lane keeping assist function including the process of automatically activating the LKA (the lane keeping assist function) after the collision (that is, after the deployment of the airbag) may be executed as illustrated in FIG. 6, other than the interruption condition change process of the lane keeping assist function illustrated in FIG. 5. FIG. 6 is a flowchart illustrating another example of the interruption condition change process. Furthermore, the processes of step S31 to step S34 of FIG. 6 are executed every predetermined calculation period. The interruption condition change process illustrated in FIG. 6 is executed in parallel with the lane keeping assist control process illustrated in FIG. 4. When the process illustrated in FIG. 6 is executed, the driving assist control ECU 1 can execute the lane keeping assist function after excluding the condition for the hands free state from the interruption condition for the LKA (the lane keeping assist function) in advance, when the deployment of the airbag is detected even when the LKA (the lane keeping assist function) is not executed.

As illustrated in FIG. 6, the collision detection unit 1c of the driving assist control ECU 1 determines whether the airbag is deployed by detecting the collision of the vehicle based on the collision generation signal input from the airbag ECU 3 to the driving assist control ECU 1 (step S31). Furthermore, in step S31, when the collision detection unit 1c of the driving assist control ECU 1 determines that the airbag is not deployed (step S31: No), the collision detection unit 1c terminates this process and returns to step S31.

In step S31, when the lane departure prevention unit 1a of the driving assist control ECU 1 determines that the airbag is deployed by the collision detection unit 1c of the driving assist control ECU 1 (step S31: Yes), the lane departure prevention unit 1a changes the interruption condition so that the interruption does not occur due to the hands free determination in the interruption condition for the LKA (the lane keeping assist function) (step S32). Specifically, the condition for the hands free state in which the driver does not grip the steering wheel (the hands free detection state) in the interruption condition for the lane keeping assist function illustrated in FIG. 3 is excluded from the interruption condition for the lane keeping assist function.

The lane departure prevention unit 1a of the driving assist control ECU 1 determines whether the control of the LKA (the lane keeping assist function) is not executed by checking the type of the flag erected in step S14 or step S16 of FIG. 4 (step S33).

Here, in step S33, when the lane departure prevention unit 1a of the driving assist control ECU 1 checks a flag indicating a state where the control of the LKA (the lane keeping assist function) is not executed (step S33: Yes), the lane departure prevention unit 1a activates the LKA (the lane keeping assist function) (step S34). That is, in step S34, when the lane departure prevention unit 1a of the driving assist control ECU 1 automatically activates the LKA (the lane keeping assist function) by activating the traveling control of preventing the departure of the vehicle from the lane, even when the condition in which the condition indicating a state where the lane is recognized is excluded from the plurality of conditions set in the activation condition for the lane keeping assist function (for example, as illustrated in FIG. 3, the LKA switch is turned on, the traveling vehicle speed is within a predetermined range, the system error is not detected, and the turn signal is not activated) is not satisfied when the collision detection unit 1c detects the collision. Furthermore, in step S33, when the lane departure prevention unit 1a of the driving assist control ECU 1 checks a flag indicating a state where the control of the LKA (the lane keeping assist function) is executed (step S33: No), the lane departure prevention unit 1a terminates this process and returns to step S31.

Furthermore, in the above-described embodiment, an example has been described in which the driving assist control ECU 1 executes the LKA (the lane keeping assist function) in the ACC state, but the invention is not limited thereto. The driving assist control ECU 1 may continuously perform the LKA (the lane keeping assist function) even in the state where the ACC cannot be operated due to the failure of the ACC radar caused by the collision.

REFERENCE SIGNS LIST 1 driving assist control ECU (vehicle control device)
2 lane recognition camera
3 airbag ECU
4 vehicle speed sensor
5 yaw rate sensor
6 acceleration sensor
7 steering ECU
8 steering actuator

The invention claimed is:
1. A vehicle control device comprising:
an electronic control unit configured to:
control an execution of a traveling control of preventing a vehicle from departing from a lane;
detect whether a steering wheel is being gripped by a driver; and detect whether the vehicle collides with an object outside the vehicle, wherein in a case that a collision during the traveling control is not detected, the electronic control unit does not interrupt the traveling control at a time the steering wheel is gripped, and interrupts the traveling control at a time the steering wheel is not gripped, and in a case that a collision during the traveling control is detected, the electronic control unit does not interrupt the traveling control at the time the steering wheel is gripped or at the time the steering wheel is not gripped.

2. A vehicle control device comprising:

an electronic control unit configured to:

control an execution of a traveling control of preventing a vehicle from departing from a lane;

detect whether a steering wheel is gripped by a driver; and detect whether the vehicle collides with an object outside the vehicle, wherein the electronic control unit activates the traveling control, in a case that an activation condition for the traveling control, including at least a state that the lane along which the vehicle travels is recognized, is satisfied, the electronic control unit interrupts the traveling control that has been activated, in a case that an interruption condition for the traveling control, including a state when the steering wheel is not gripped, is satisfied, wherein in a case that a collision is not detected, the state when the steering wheel is not gripped is included in the interruption condition, and in a case that a collision is detected, the state when the steering wheel is not gripped is not included in the interruption condition.

3. The vehicle control device according to claim 2, wherein in a case that all the activation conditions for the traveling control are satisfied, in which a plurality of conditions including at least a state that the lane is recognized is set, the lane departure prevention unit activates the traveling control, and in the case that a collision is detected, the electronic control unit activates the traveling control, even when a condition, in which the condition indicating the state that the lane is recognized is excluded from the plurality of conditions set in the activation condition, is not satisfied.

* * * * *